United States Patent
Grindstaff et al.

(10) Patent No.: US 8,228,378 B2
(45) Date of Patent: Jul. 24, 2012

(54) REAL-TIME COMPOSITE IMAGE COMPARATOR

(75) Inventors: Gene A. Grindstaff, Decatur, AL (US); Sheila G. Whitaker, Gurley, AL (US)

(73) Assignee: Hexagon Technology Center GmbH, Heerbrugg (CH)

( * ) Notice: Subject to any disclaimer, the term of this patent is extended or adjusted under 35 U.S.C. 154(b) by 0 days.

(21) Appl. No.: 13/085,629

(22) Filed: Apr. 13, 2011

(65) Prior Publication Data

US 2011/0188762 A1   Aug. 4, 2011

Related U.S. Application Data

(63) Continuation of application No. 11/196,494, filed on Aug. 3, 2005, now Pat. No. 7,961,216.

(60) Provisional application No. 60/598,738, filed on Aug. 4, 2004.

(51) Int. Cl.
  *H04N 7/12* (2006.01)
(52) U.S. Cl. ......... 348/144; 348/143; 348/145; 348/159
(58) Field of Classification Search .......... 348/143–145, 348/159
  See application file for complete search history.

(56) References Cited

U.S. PATENT DOCUMENTS

| | | | | |
|---|---|---|---|---|
| 5,325,449 A | * | 6/1994 | Burt et al. | 382/240 |
| 5,880,778 A | * | 3/1999 | Akagi | 348/218.1 |
| 6,044,181 A | * | 3/2000 | Szeliski et al. | 382/284 |
| 6,205,259 B1 | * | 3/2001 | Komiya et al. | 382/284 |
| 6,424,752 B1 | * | 7/2002 | Katayama et al. | 382/284 |
| 7,009,638 B2 | * | 3/2006 | Gruber et al. | 348/218.1 |
| 7,948,524 B2 | * | 5/2011 | Endo et al. | 348/222.1 |

* cited by examiner

*Primary Examiner* — Jay Patel
*Assistant Examiner* — Geepy Pe
(74) *Attorney, Agent, or Firm* — Sunstein Kann Murphy & Timbers LLP

(57) ABSTRACT

An apparatus and method for preparing a composite image from a video data stream and for identifying changed features in two composite images. Frames from the video data stream are transformed to a projected 2D image, aligned with adjacent frames and overlapping areas are averaged to provide a higher apparent resolution. The composite image can be stored in real-time. As a second composite image is prepared of the same location at a later time, portions of the second image can be compared to corresponding portions of the stored image after the intensities of the images are equalized. Image areas whose absolute difference exceeds a threshold are again intensity equalized. Areas that are again above threshold can be flagged for further scrutiny, either by a human or by a machine that performs object recognition. In this way, composite video images of a scene can be prepared and compared in real-time.

13 Claims, 4 Drawing Sheets ns, in which:

REAL-TIME COMPOSITE IMAGE COMPARATOR

The present application is a continuation of copending U.S. patent application Ser. No. 11/196,494, filed Aug. 3, 2005, which claims priority from U.S. provisional patent application No. 60/598,738, filed Aug. 4, 2004, each application entitled "Real-Time Composite Image Comparator." Each of these applications is incorporated herein by reference.

TECHNICAL FIELD

The present invention generally relates to image analysis and, more particularly, the invention relates to comparing image data.

BACKGROUND ART

Preparation of imagery from aerial photographs has been an expensive and time-consuming process. Imagery data from aerial photography has been prepared by taking downward looking high resolution aerial photographs, developing the film, assembling and registering the photographs into a mosaic pattern, and digitizing the composite photographs. This process is expensive and time-consuming. A method is needed to inexpensively and quickly prepare high-resolution composite imagery of a scene from a motion picture or video data stream.

SUMMARY OF THE INVENTION

In various embodiments of the invention, an apparatus and method prepare a composite image of a scene, such as a terrain scene, from a video data stream. The video stream includes a series of images with some of the images containing overlapping coverage of the scene. The images are transformed, aligned, and overlapping areas of the images are then averaged. The averaging of overlapping images advantageously provides a much higher apparent resolution. As portions of the composite image of the scene are created, these portions are immediately available for real-time processing including identification of significant differences from images taken earlier of the same scene. The composite image of the scene may be stored for later processing and comparison.

In accordance with one aspect of the invention, an apparatus and method can identify differences in two composite images of a scene. For example, the two images may be an archived composite image of a certain landscape and a composite image prepared from a real-time image data stream of the same landscape. The comparison may occur in real-time while the second composite image is being prepared. Embodiments may use techniques to ensure that the comparison is substantially invariant to seasonal changes (e.g., light) to produce consistent difference results.

Illustrative embodiments of the invention are implemented as a computer program product having a computer usable medium with computer readable program code thereon. The computer readable code may be read and utilized by a computer system in accordance with conventional processes.

BRIEF DESCRIPTION OF THE DRAWINGS

The foregoing features of the invention will be more readily understood by reference to the following detailed description, taken with reference to the accompanying drawings, in which.

DETAILED DESCRIPTION OF SPECIFIC EMBODIMENTS

In various embodiments of the invention, an apparatus and method prepare a composite image of a scene, such as a terrain scene, from a video data stream. The video stream includes a series of images with some of the images containing overlapping coverage of the scene. The images are transformed, aligned, and overlapping areas of the images are then averaged. The averaging of overlapping images advantageously provides a much higher apparent resolution. As portions of the composite image of the scene are created, these portions are immediately available for real-time processing including identification of significant differences from images taken earlier of the same scene. The composite image of the scene may be stored for later processing and comparison.

In accordance with another aspect of the invention, an apparatus and method can identify differences in video data streams in real-time. One image of the scene may be a stored image and the other image may be an image processed in real-time or both images may be stored images. Composite images of the same scene taken at different times are prepared according to the previously described embodiment of the invention. The two images of the scene are compared by adjusting sub-tiles of each image that correspond to the same location to the same average intensity. The absolute difference between the sub-tiles is then calculated and compared to a specified threshold. If the difference in any area of the tile is above the threshold, the average intensity in that specific region may be equalized between the two images. If the difference is still above the threshold, the region is marked for further scrutiny. If desired, the resulting difference image may be passed to analysis packages, as are known in the art, which recognize previously defined patterns. The result is automatic, real-time recognition of predefined changes or events in subsequent video data streams.

Illustrative embodiments of the invention may be implemented as a computer program product having a computer usable medium with computer readable program code thereon. The computer readable code may be read and utilized by a computer system in accordance with conventional processes. Details of illustrative embodiments are discussed below.

Image Compositor

In an embodiment of the present invention, an apparatus and method prepare a composite image of a scene from a series of video images. The image compositor includes an image transformer module, an image alignment module and an image averager module. The filters work in series in real-time so that the image can be archived and/or compared to another image. The purpose of the image compositor is to build a piecewise time invariant image of the scene.

A. Image Transformation

Figure 1:
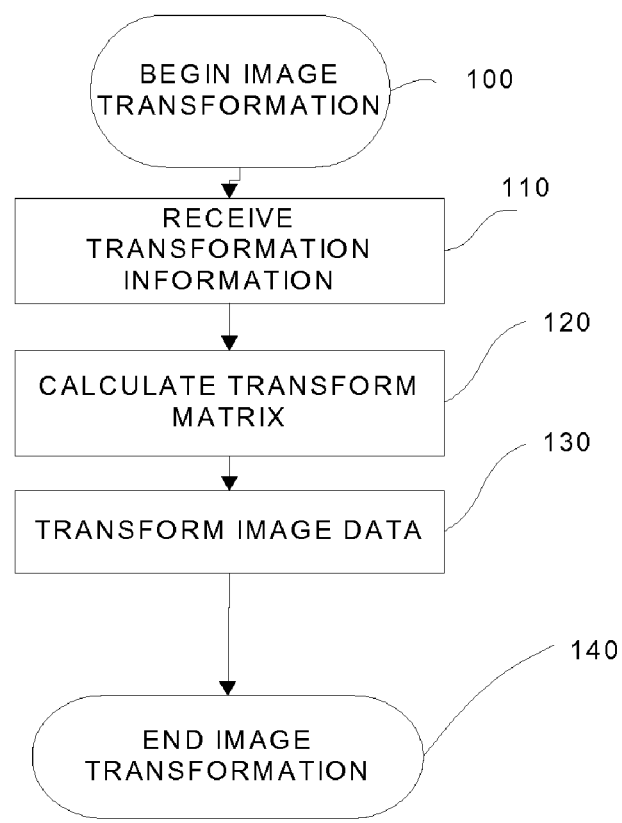
FIG. 1 is a flow diagram of a process to transform a video data stream image to a 2D view, according to an embodiment of the invention.

As shown in FIG. 1, the image transformer module 100 uses 110 GPS, a pointing vector, range, and the camera view cone information provided with the video stream to transform the video so that it can be projected onto a planar map. The transform information could also come 110 from other sources such as user defined view cones, or automatically defined monument points for image matching. A simple 3D transform matrix is calculated 120 to project the video image in a linear fashion onto a flat surface. The resulting image is scaled and rotated 130 about multiple coordinate axes so that the perspective view of the camera is compensated for. Each pixel is multiplied by a matrix operation. The transform compensates 140 for non-square pixels, and may use bi-cubic interpolation as part of the scaling process.

B. Image Alignment

Figure 2:
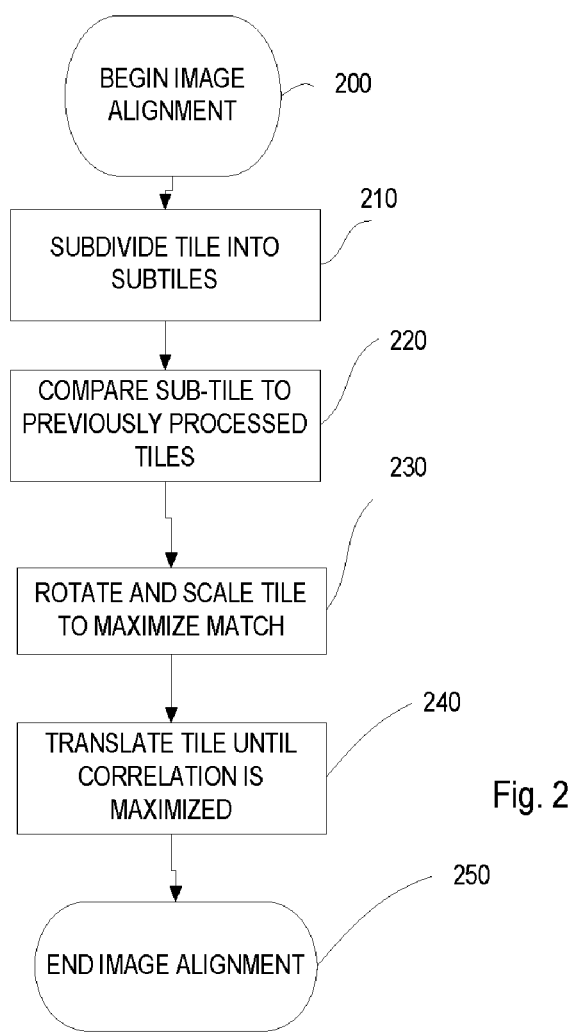
FIG. 2 is a flow diagram showing a process to align a video data stream frame to a previously processed frame, according to an embodiment of the invention.

As shown in FIG. 2, portions of the image are then aligned 200. Once the image has been projected onto a plane, the image is broken into tiles that are approximately the size of the video resolution, after it has been compensated, so that the pixels are square. Each tile is then subdivided 210 into nine sub-tiles. Each sub-tile is compared 220 to previously stored tiles where they overlap. The process consists of comparing the tile in its current location, with four other adjacent locations. The adjacent locations are 50 percent offset from the center of the sub-tile above, below, left, and right of the sub-tile. The offset images are compared to existing overlapping images using simple correlation techniques. A rotational and scaling matrix is calculated 230 to adjust the whole tile so that it is an exact match to adjacent overlapped images to an accuracy of up to 0.1 pixels. The sub-tile is translated 240 in an iterative process until the correlation is maximized, or a maximum number of iterations have occurred. If there are no overlapping images, the tile is stored in the composite image. If the image fails to correlate, it is checked to verify it is a valid image. If it is a valid image it is passed on to the image averager module 250.

C. Image Averaging

Figure 3:
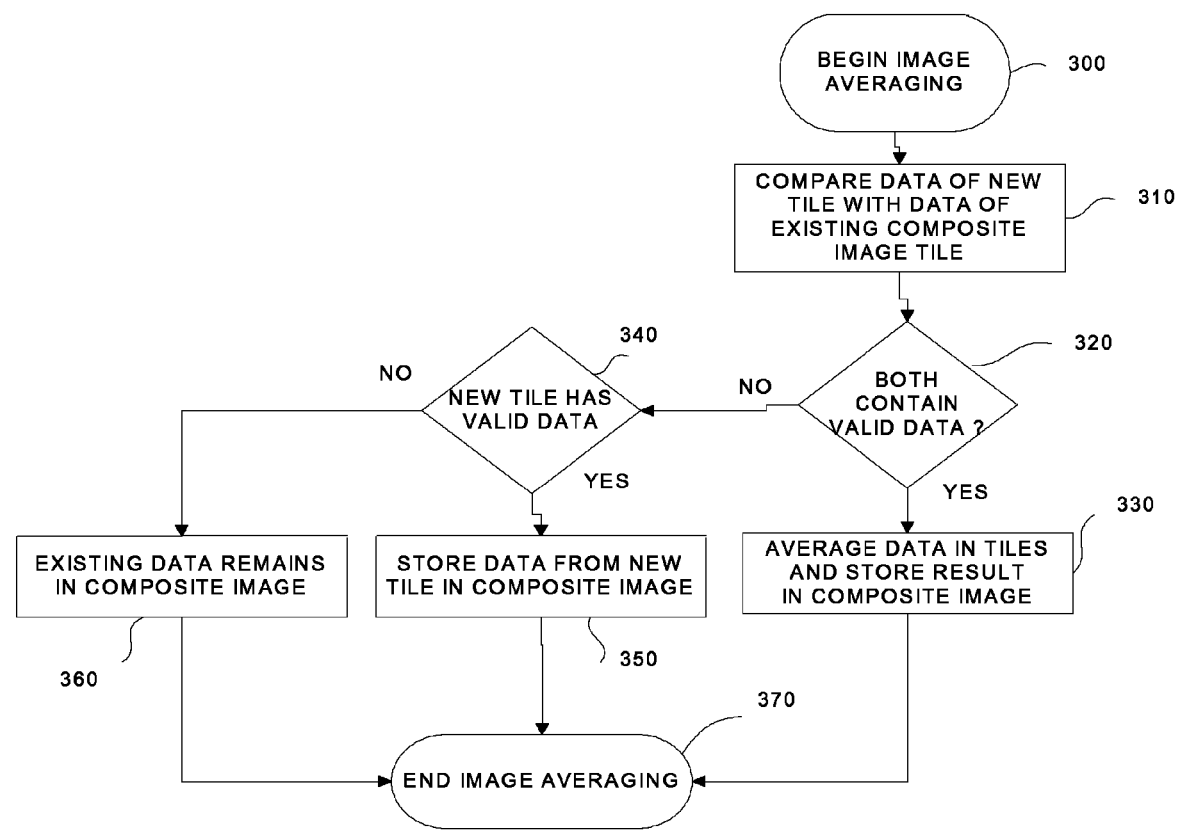
FIG. 3 is a flow diagram showing averaging of image tile data, according to an embodiment of the invention.

As illustrated in FIG. 3, the image averager module determines 300 where a tile overlaps with existing tiles by comparing 310 the values of the image data. If valid data exists in the new tile 320, and the existing composite image tile has valid data in that region, then the overlapping images are averaged 330 using a modified running average technique. Because each tile is adjusted to a sub-pixel alignment, the resulting averaged composite image has a higher apparent resolution that is available from the video data stream.

If a portion of the new tile does not have existing data in the composite tile 340, then the new information is put into the composite image as is 350. If a portion of the composite image has data, but the new tile does not 360, then the existing data in the composite image remains as it was 370.

Once an image tile moves out of range of a composition area, it may be archived. In a specific embodiment of the invention, an archiver module may use the geometric location of the tile to archive it into a modified quad-tree file storage system. The tree is indexed to allow very quick access to images by geometric location. The top of the tree stores the range of the entire tree. The tree is subdivided geometrically into branches that represent sub-regions of the overall range. As new images are inserted into the tree, the overall range of the tree can grow piecewise. When queried, unpopulated branches of the tree return a null value so that void areas can be quickly determined.

Image Comparator

Figure 4:
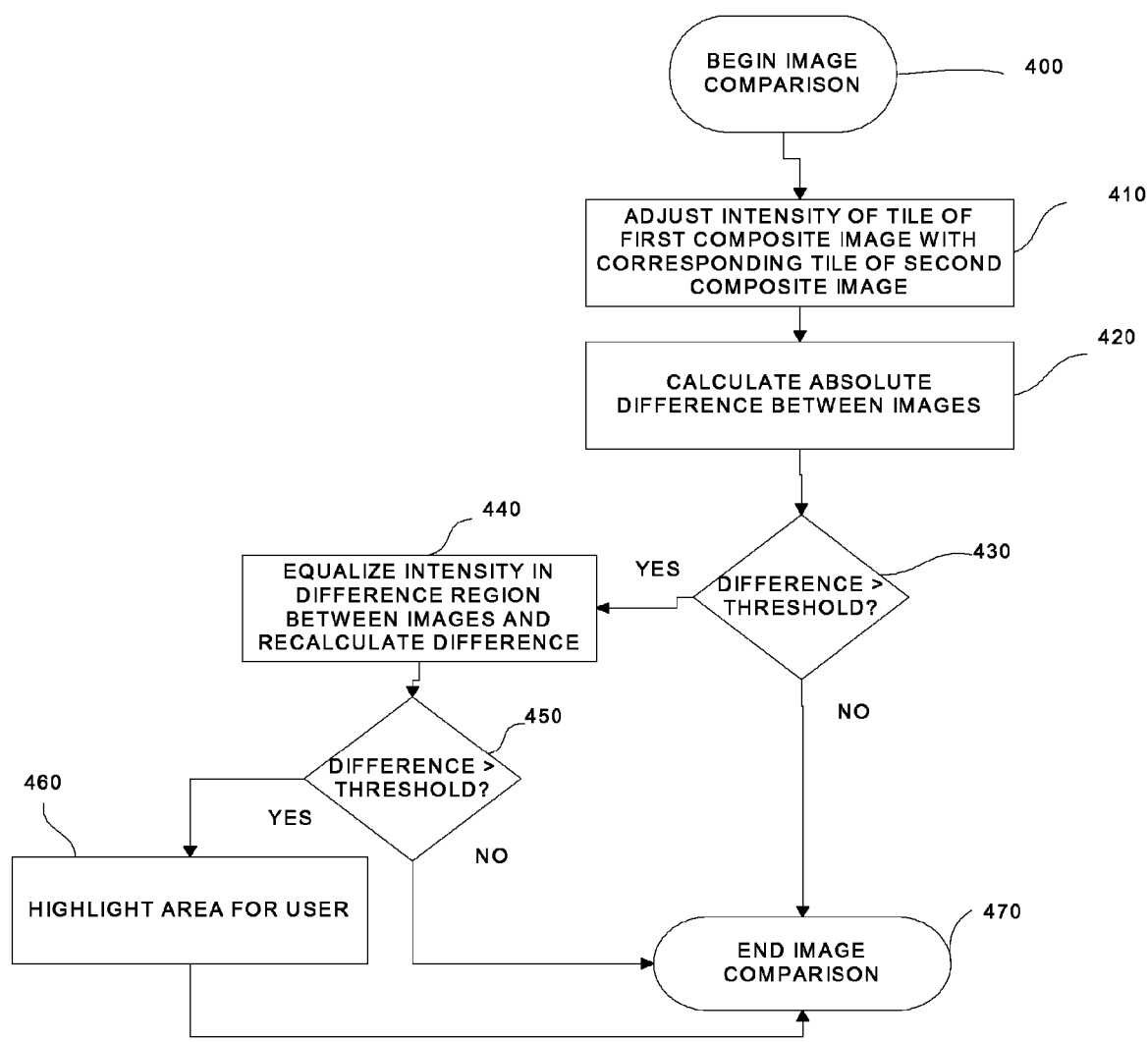
FIG. 4 is a flow diagram illustrating a process for comparing two composite images to determine significant differences, according to an embodiment of the invention.

As illustrated in FIG. 4, the image comparator module takes a tile or portion of an image that has been built in the image compositor and compares 400 the tile to the corresponding location in a second image of the scene, which may be a stored image. The overlapping areas (i.e., areas that correspond to the same location in the scene) are adjusted 410 so that the portions of each image are of the same average intensity. The absolute difference between the two overlapping images portions is then calculated 420. If the difference in any area is above a user defined threshold 430, then the input composite image is examined in the area where a significant difference exists. The average intensity in that region is compensated 440 so that it equals the corresponding region in the second image. The absolute difference is calculated again for that region. If the difference is still above the user defined threshold 450, then it is marked so that the contrast and intensity can be highlighted for the user 460. If desired, the resulting difference image can then be passed to analysis packages, as are known in the art, which recognize previously defined patterns. The image comparator may advantageously provide 470 automatic, real-time recognition of predefined changes or events in subsequent video data streams In specific embodiments of this aspect of the invention, edges of objects in the image are detected and eliminated before the two images are compared. Objects often differ because of slightly different viewing angles. If these edges are eliminated, then only the internal part of the object is compared. This procedure results in fewer false positive comparisons.

It should be noted that discussion of video data streams is exemplary and not intended to limit the scope of all embodiments. Rather, various embodiments apply to image data that can be represented graphically and recorded to some medium. In illustrative embodiments, the image data is recordable in 2D. In a similar manner, discussion of environmental objects (e.g., a landscape) is exemplary. For example, illustrative embodiments may be used in an interior location (e.g., a building containing a bank, or plane hangar) to detect changes in certain items of interest.

Various embodiments of the invention may be implemented at least in part in any conventional computer programming language. For example, some embodiments may be implemented in a procedural programming language (e.g., "C"), or in an object oriented programming language (e.g., "C++"). Other embodiments of the invention may be implemented as preprogrammed hardware elements (e.g., application specific integrated circuits, FPGAs, and digital signal processors), or other related components.

In some embodiments, the disclosed apparatus and methods may be implemented as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., WIFI, microwave, infrared or other transmission techniques). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software.

Although the above discussion discloses various exemplary embodiments of the invention, it should be apparent that those skilled in the art can make various modifications that will achieve some of the advantages of the invention without departing from the true scope of the invention.

What is claimed is:

1. A computerized method for comparing a first image of a scene and a second image of the scene comprising:
   a. providing the first image of the scene and the second image of the scene;
   b. using a computer, adjusting a given area of the first image to approximately equal the average intensity of a given area of the second image, the given area of the first image and the given area of the second image corresponding to the same location in the scene;
   c. using the computer, calculating the absolute difference in intensity between the given area of the first image after adjustment and the given area of the second image and identifying a selected portion of the given area of the first image where the absolute difference is above a threshold; and
   d. using the computer, adjusting the average intensity of the selected portion of the given area of the first image to approximately equal the average intensity of the corresponding portion of the given area of the second image and marking the selected portion where the absolute difference between the selected portion and the corresponding area in the second image is above the threshold.

2. The method according to claim 1 wherein providing the first image includes capturing a video sequence with a video camera.

3. The method according to claim 1 wherein the scene is a terrain scene.

4. The method according to claim 1 wherein providing the first image includes transforming a first series of images using the computer.

5. The method according to claim 4 wherein transforming the first series of images includes projecting the first series of images onto a two-dimensional surface.

6. The method according to claim 1 wherein adjusting a given area of the first image begins executing before providing the second image of the scene completes.

7. The method according to claim 1 wherein edges are removed from the first image and from the second image before calculating the absolute difference in intensity between the given area of the first image after adjustment and the given area of the second image.

8. A computer program product for use on a computer system for comparing a first image of a scene and a second image of the scene, the computer program product comprising a non-transitory computer readable medium encoded with computer readable program code, the computer readable program code including:
   a. program code for adjusting a given area of the first image to approximately equal the average intensity of a given area of the second image, the given area of the first image and the given area of the second image corresponding to the same location in the first scene;
   b. program code for calculating the absolute difference in intensity between the given area of the first image after adjustment and the given area of the second image and identifying a selected portion of the given area of the first image where the absolute difference is above a threshold; and
   c. program code for adjusting the average intensity of the selected portion of the given area of the first image to approximately equal the average intensity of the corresponding portion of the given area of the second image and marking the selected portion where the absolute difference between the selected portion and the corresponding area in the second image is above the threshold.

9. The computer program product according to claim 8, wherein the scene is a terrain scene.

10. The computer program product according to claim 8 wherein the program code is configured so that edges are removed from the first image and from the second image before calculating the absolute difference in intensity between the given area of the first image after adjustment and the given area of the second image.

11. A system comprising one or more processors operable to perform operations comparing a first image of a scene and a second image of the scene, the operations including:
    a. adjusting a given area of the first image to approximately equal the average intensity of a given area of the second image, the given area of the first image and the given area of the second image corresponding to the same location in the scene;
    b. calculating the absolute difference in intensity between the given area of the first image after adjustment and the given area of the second image and identifying a selected portion of the given area of the first image where the absolute difference is above a threshold; and
    c. adjusting the average intensity of the selected portion of the given area of the first image to approximately equal the average intensity of the corresponding portion of the given area of the second image and marking the selected portion where the absolute difference between the selected portion and the corresponding area in the second image is above the threshold.

12. The system according to claim 11, wherein the scene is a terrain scene.

13. The system according to claim 11 wherein the one or more processors is configured so that edges are removed from the first image and from the second image before calculating the absolute difference in intensity between the given area of the first image after adjustment and the given area of the second image.

* * * * *